March 4, 1958

L. W. SMITH 2,825,125

DEVICE FOR SEPARATING THE CASES AND PLATES
OF OLD STORAGE BATTERIES

Filed March 3, 1954

LESTER W. SMITH
INVENTOR.

BY
*Attorney*

March 4, 1958 L. W. SMITH 2,825,125
DEVICE FOR SEPARATING THE CASES AND PLATES
OF OLD STORAGE BATTERIES
Filed March 3, 1954 2 Sheets-Sheet 2
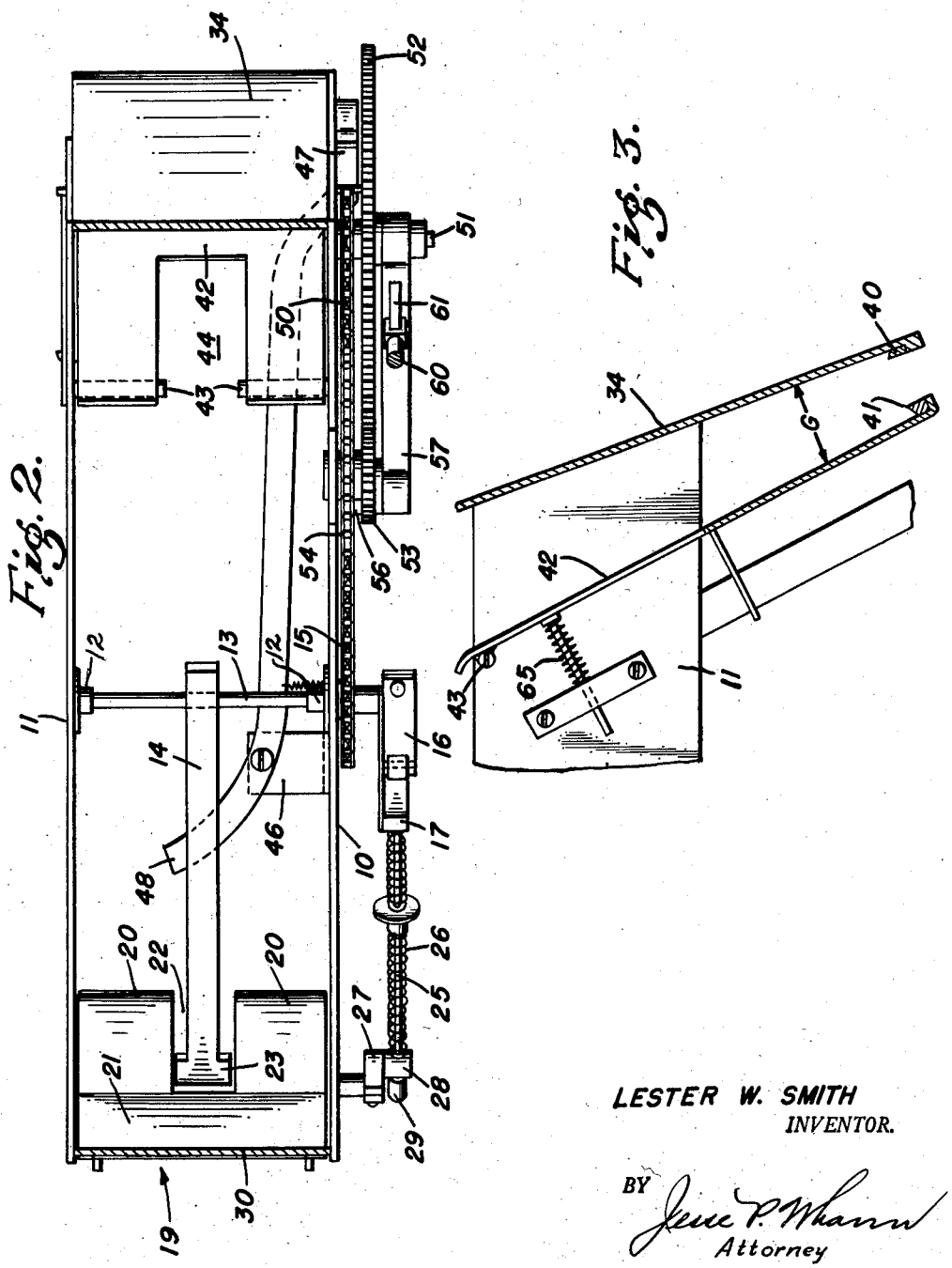
LESTER W. SMITH
INVENTOR.
BY
Attorney

United States Patent Office 2,825,125
Patented Mar. 4, 1958

2,825,125

DEVICE FOR SEPARATING THE CASES AND PLATES OF OLD STORAGE BATTERIES

Lester W. Smith, Gardena, Calif., assignor to Smith-Reisor Co., Inc., Lynwood, Calif., a corporation of California Application March 3, 1954, Serial No. 413,756

15 Claims. (Cl. 29—204)

My invention relates to a device for reclaiming the lead from old storage batteries and consists of a device of simple and rugged form which effectively removes the lead plates from the cases of storage batteries and delivers the plates and cases to two separate places. It will be understood that along with the lead plates the remainder of the contents of the battery cases will be separated therefrom. That is to say, the act of removing the lead plates will also remove the lead connector bars and posts, the compounded rubber battery case covers, and the separators which are arranged between the lead plates. It is an object of the invention to provide a compact and sturdy device having means to propel the battery at high velocity through a predetermined path, and also having means for abruptly retarding or stopping the forward movement of the battery case whereupon momentum acting in the battery case contents will cause such contents to continue in forward movement and thereby leave the battery case which is subsequently discharged sidewardly from the device to a means of disposal separate from the container, conveyor or the like which receives the battery contents.

It is an object of the invention to provide a device having a movable member adapted to receive a battery in an initial position, this movable member being adapted to impel the battery at increasing speed until a high speed of movement of the battery is obtained, there being shoulder means positioned so as to be engaged by the case of the battery which is travelling at high velocity, thereby stopping the movement of the case while continued forward movement of the contents of the battery case, due to momentum therein, causes the contents to leave the battery case, thereby accomplishing the desired separation.

It is a further object of the invention to provide a device having an arm and means to rotate this arm around an axis of rotation, there being means for varying the rate of rotation of the arm around the axis in a characteristic manner, there being means for placing a battery on the arm, when thte arm is revolving at substantially zero speed, and means to receive the battery after it has reached a high speed of movement around the axis of rotation, said last named means having shoulders arranged to be engaged by the wall or walls of the battery case so as to stop the forward movement of the battery substantially instantaneously, momentum then acting in the battery contents causing them to continue forward movement and leave the battery case.

It is a further object of the invention to provide a device of this character having eccentric gear means for effecting movement of the battery propelling arm in the manner described in the foregoing. In the preferred form of the invention disclosed herein the gear means are interconnected by a continuous chain in such a manner that when one of them is in a low leverage position, the other is in a high leverage position, the result of this connection of the gear means being to cause the battery propelling arm to act like a whip, gradually increasing from substantially zero speed to high velocity so that the battery is thrown forcibly into a position wherein the battery case is engaged and substantially stopped so that separation of the battery contents therefrom will be effected by the continued forward movement thereof.

In the preferred form of the invention means are provided for taking up the slack in the chain which interconnects the gear means, thereby holding the chain taut at all times.

It is a further object of the invention to provide a device of the character described herein having means for removing tthe battery cases after the contents have been removed therefrom, and a further object of the invention is to provide means for automatically moving batteries into position to be picked up by the battery propelling arm of the device.

Further objects and advantages of the invention may be brought out in the following part of the specification wherein details of the preferred embodiment of the invention have been given for the purpose of disclosing a preferred form of the invention, without, however, intending to limit the scope of the invention which is set forth in the appended claims.

Referring to the accompanying drawings which are for illustrative purposes only:

Fig. 2 is a sectional view taken substantially as indicated by the line 2—2 of Fig. 1; and Fig. 3 is a fragmentary sectional view showing an alternative means for adjusting the width of the gap.

Figure 1:
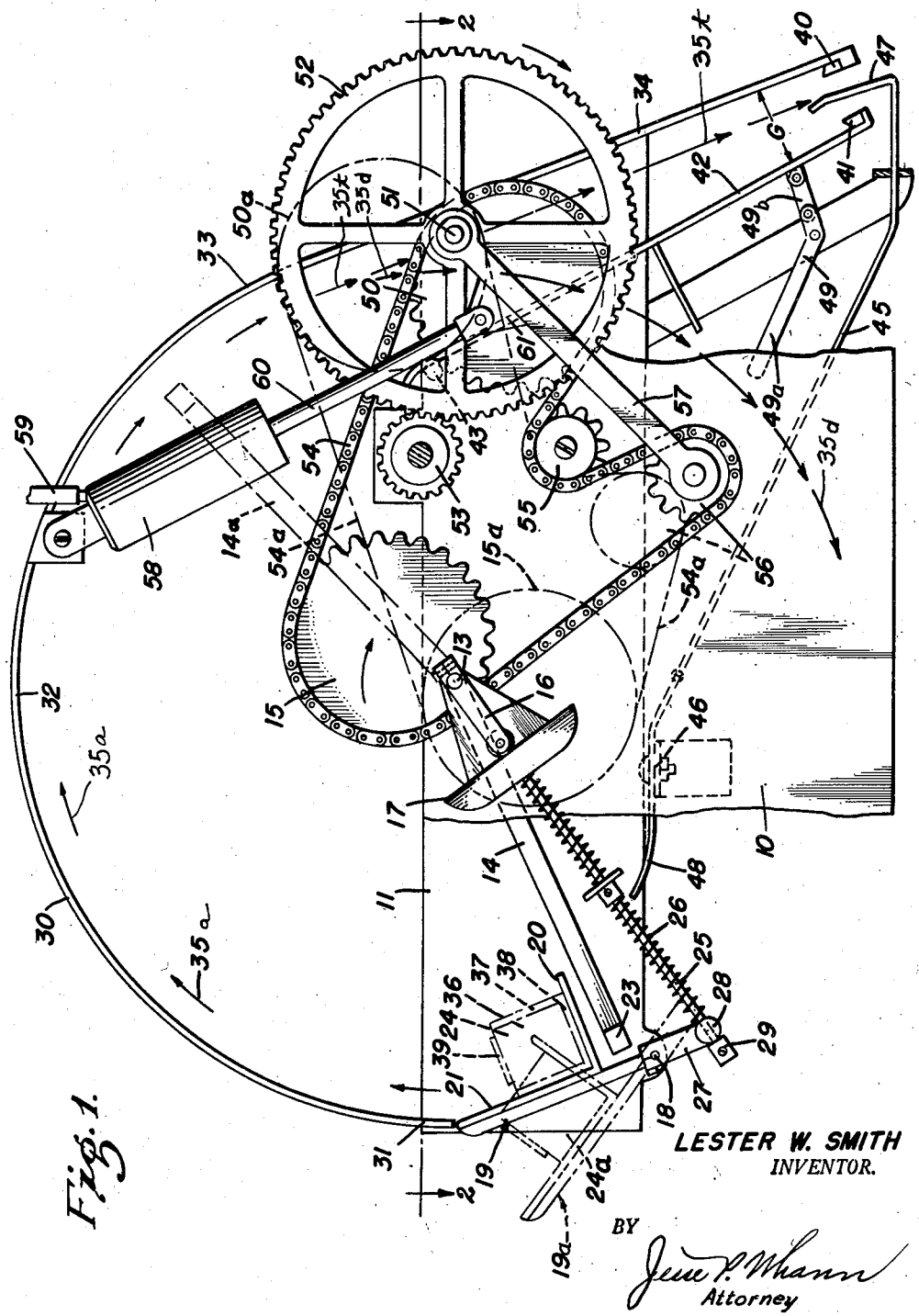
Fig. 1 is a schematic elevational view of a preferred form of the invention, with the battery propelling arm approaching the position in which it picks up a battery from a suitable support.

For the purpose of simplifying the disclosure, the presentation of the cooperating parts of the invention is schematic. A vertical supporting wall 10 is provided, which, in Fig. 1 is broken away so that a plate 11 will be shown, this plate 11 being horizontally elongated and in a vertical plane parallel to the plane of the wall 10, as shown in Fig. 2. Aligned bearings 12 near the centers of the wall 10 and the plate 11 support a shaft 13 for rotation. On the portion of the shaft 13, between the members 10 and 11 a battery propelling arm 14 is fixed, and on the near end of the shaft 13 an eccentric gear member 15 is fixed. Also, on the near end of the shaft 13 there is a lever 16 arranged to periodically act as a cam in shifting a follower member 17 leftwardly against the force of a spring 18.

To the left of, and downwardly offset from the shaft 13 there is a shaft 18 which carries a battery holder 19 comprising a bottom wall 20 and a side wall 21 disposed at substantially right angles. The bottom wall 20 of the battery holder 19, as shown in Fig. 2, has an opening 22 therein through which the outer end portion 23 of the arm 14 may pass when the arm 14 moves upwardly from the position in which it is shown in Fig. 1. A battery is shown by dotted lines 24 resting upon the bottom wall or platform 20 of the support. This battery 24 extends over a portion of the opening 22 of the bottom wall 20 and is in the path of upward movement of the outer end portion 23 of the arm 14. The end portion of the arm 14, accordingly, will engage the battery 24 and move the same upwardly from the position in which it is shown in dotted lines. Thereafter the battery holder 19 will swing back into a position shown by dotted lines 19a. The movement of the battery holder 19 is accomplished by the cam lever 16 acting through the cam follower 17, a rod 25 and spring means 26 connected with a lever 27 which is fixed on the near end of the shaft 18 in downwardly extending position, as shown in Fig. 1. On the lower end of the lever 27 there is a boss 28 through which the leftward end of the rod 25 extends, there being a head 29 on the leftward extremity of the rod 25. When the cam lever 16 forces the follower 17 leftwardly, the lower end of the lever 27 is forced leftwardly so as to rotate the shaft 18 in clockwise direction, thereby carrying the battery holder 19 and the battery 24 from the dotted line positions 19a and 24a thereof into their full line positions. When the cam lever 16 swings upwardly from the position in which it is shown in full lines in Fig. 1, the follower 17 is permitted to move rightwardly so that the battery holder may drop back into the dotted line position 19a, in which position it may receive thereon another battery.

An arcuate guide consisting of an arcuate wall 30 is provided to cause the battery 24 to follow an arcuate path when it is propelled by the end portion 23 of the lever 14. This guide wall 30 has a width substantially equal to the width of the space between a wall 10 and the plate 11. The leftward end 31 of the guide wall 30 is secured to the leftward ends of the wall 10 and the plate 11, by welding, for example, and it has a curved portion 32 which follows an arc inscribed around the axis of the shaft 13, this curved portion 32 merging at the point 33 with a tangential portion 34 which is connected to the rightward ends of the wall 10 and the plate 11 and defines a tangential path of movement 35t extending from the end of the arcuate path of movement indicated by arrows 35a. The leftward end 31 of the guide wall 30 is contiguous to the upper end of the side wall 21 of the battery holder 19. Therefore, when the arm 14 propels the battery 24 upwardly from the position thereof on the holder 19, the leftward face of the battery 24 will engage the guide wall 30 and will slide along the inner face thereof through the arcuate path of movement indicated by arrows 35a and then along the succeeding tangential path of movement 35t which diverges from the path of movement 35d of the end portion 23 of the arm 14 continuing beyond the rightward end of the arcuate path of movement 35a.

The battery, Fig. 1, is indicated as having a case 36 with side walls 37 and a bottom wall 38. The upper end of the case 36 is open and a portion of the battery case contents 39 projects upwardly therefrom. As the battery 24 is propelled through the path 35, it is inverted, so that by the time the battery reaches and slides along the tangential portion 34 of the wall 30, its top, open end will be faced downwardly. Means are provided for engaging the battery case 36 when the battery 24 reaches a position at the lower end of the tangential portion 34, for the purpose of stopping or at least retarding downward movement of the battery case so that the contents thereof will, by action of momentum therein, move out of or be thrown out of the battery case. In the preferred practice of the invention the simple means which I provide for accomplishing this comprises shoulders 40 and 41 arranged in spaced relation at the lower end of the wall portion 34 and so as to engage the upper edges of the side wall 37 of the battery case 36, to abruptly or instantly stop the downward movement of the battery case, momentum thereafter acting in the contents of the battery case to move the same downwardly from the case 36 which is then supported upon the shoulders 40 and 41. The shoulder 40 is secured to the lower extremity of the tangential wall portion 34 and the shoulder 41 is on the lower end of a plate 42 which is arranged in spaced relation to the tangential wall portion 34 in upwardly diverging relation thereto. The upper end of the plate 42 is hinged on a transverse pin 43 so that the lower end of the plate 42 and the shoulder 41 may be adjusted with relation to the lower end of the tangential portion 34 in keeping with the width of the battery to be separated. The upper portion of the plate 42 has therein an opening 44 through which the arm 14 may pass from the position 14a thereof toward the starting position in which it is shown in full lines.

Means are provided for shifting the battery case 36 leftwardly from its position between the lower ends of the members 34 and 42, after ejection of the battery contents. This means comprises a lever 45 which is swung on a vertical hinge pin 46 and has at its rightward end an upwardly extended portion 47 arranged, when the lever 45 is swung, to be moved from its position at a side, through the space between the lower ends of the members 34 and 42, to shift therefrom the emptied battery case. The movement of the lever 45 is accomplished in timed relation to the movement of the arm 14 by the provision of an extension 48 on the leftward end of the lever 45 positioned so that it will be engaged by the arm 14 as the arm 14 moves in clockwise direction toward the starting position in which it is shown in full lines at Fig. 1. The arm 14 pushes the lever extension 48 sidewardly, thereby causing the lever 45 to swing in counterclockwise direction, as viewed in Fig. 2, whereupon the upward extension 47 of the arm 45 will traverse the space between the lower portions of the members 34 and 42. As mentioned hereinbefore, the plate 42 is adjustable with relation to the portion 34. It is held in adjusted position by an adjusting means 49 including a lever 49a and a toggle 49b arranged so as to hold the plate 42 in such position that the gap G between the member 34 and 42 will be slightly greater than the width of the battery case 36. By swinging the lever 49a the toggle 49b will be caused to increase the width of the gap G so as to receive batteries of greater width.

A further feature of the invention is the provision of means for increasing the velocity of the arm 14 as it moves from its full line position in Fig. 1 toward the position 14a thereof so that this arm 14 will have a whip-like action. The arm will be moving at extremely low velocity when it picks up the battery 24 from the battery holder 19, and its rate of travel will increase very rapidly as it swings upwardly from its initial position adjacent the battery holder 19, with the result that the outer end 23 of the arm 14 will reach a high velocity when the position 14a thereof is reached. The high velocity is imparted to the battery 24 with the result that it will be impelled downwardly along the tangential portion 34 of the guide wall 30 at a velocity and with such force that separation of the battery contents from the casing 36 will be positively accomplished. As the lever 14 swings downwardly from the position 14a thereof, its velocity decreases, so that by the time it reaches the position in which it is shown in full lines contiguous to the bottom wall 20 of the battery holder 19, its velocity will be extremely low. The arm operating mechanism may be arranged so that the arm 14 will be brought to an actual stop when it reaches its starting position, but this is not regarded as necessary to the practical operation of the device. All that is required is that the arm be travelling at a relatively low velocity at the time it picks up the battery and at a relatively high velocity at or near the point where the battery moves tangentially away from the end of the arm.

To accomplish this characteristic movement of the arm 14 I employ the variable lever-arm linkage described in the following. It includes a second gear means 50 arranged to effect revolution of the first gear means 15 around the axis of the shaft 13. The second gear means 50 is of the same size as the first gear means 15. That is to say, it has the same pitch diameter and the same number of teeth. It is disposed eccentrically upon a shaft 51 which is spaced rightwardly from the shaft 13 and is arranged to be revolved at constant speed around the shaft 51 by a gear 52 which is rotated by a motor driven pinion 53. The gear 52 turns upon the shaft 51, and its hub is connected to the gear means 50, so that the gear 52 and the gear means 50 revolve as a unit around the axis of the shaft 51. Operative connection between the gear means 15 and 50 is accomplished by use of the variable lever-arm linkage which includes a loop chain 54. This chain 54 runs over the teeth of the gear means 15 and 50, which teeth are, in this instance, given a sprocket-tooth form. The chain 54 also runs over an idler 55 and is looped under a take-up sprocket 56 mounted at the outer end of a downwardly and leftwardly sloping arm 57 which is arranged to swing through a limited arc around the shaft 51. A cylinder piston device 58 continuously fed with air pressure through an inlet 59, is adapted to continuously apply a downward force to the arm 57 so that the sprocket 56 will act at all times to hold the chain 54 taut. For this purpose, the device 58 has its piston rod 60 connected to a bracket 61 which is mounted on the arm 57.

The gear means 15 and 50 are shown as being mounted on their respective shafts 13 and 51 with the same eccentricity. However, they are arranged in engagement with the chain 54 so that when the gear means 15 extends upwardly from the shaft 13 on which it is fixed, the gear means 50 will extend downwardly from the shaft 15 around which it rotates. Also, when the gear means 15 extends downwardly from the shaft 13 as indicated by phantom lines 15a, the gear means 50 will extend upwardly from the shaft 51 as indicated by phantom lines 50a and the chain 54 will be positioned as indicated by phantom lines 54a. The arm 14 is fixed on the shaft 13 in such relation to the gear means 15 that when the arm 14 is in its initial position, as shown in full lines in Fig. 1, the upper run of the chain 54 will extend across a portion of the gear means 15 spaced at a considerable distance or long lever arm from the axis of rotation defined by the shaft 13. Also the upper run of the chain 54 will engage a short lever arm portion of the gear means 50 lying very close to the axis of the shaft 51, with the result that the shaft 13 and the arm 14 will be at this time revolving at very low speed. As the gear means 50 revolves leftwardly and upwardly from its full line position toward the position 50a thereof, and as the gear means 15 swings rightwardly and downwardly from its full line position toward the position 15a, the leverage relationship between the gear means will change quite rapidly, the effective lever arm at the gear 50 increasing and the effective lever arm of the gear 15 decreasing so that there will be a rapid increase of the velocity of the arm 14 as it moves upwardly from its full line position toward and through the position 14a thereof.

In the operation of the device the battery holder 19 is intermittently swung into the open position thereof 19a, and at this time the battery is placed thereon as indicated by dotted lines 24a. As the arm 14 approaches its initial position, the cam lever 16 moves into the position in which it is shown in full lines, forcing the follower member 17 leftwardly so that the battery holder 19 is swung from open position 19a into the closed position in which it is shown in full lines. Immediately thereafter upward movement of the arm 14 engages the battery 24 and moves it through the path of travel 35 with a whip-like motion. Travelling at high velocity, the battery moves downwardly along the tangentially wall 34 and when the shoulders 40 and 41 are reached separation of the contents from the case takes place.

The invention includes, as shown in Fig. 3, a yieldable adjusting means for the plate 42 instead of the positively acting toggle means 49. In the arrangement shown in Fig. 3 a spring member 65 holds the plate 42 forwardly (rightwardly) so that the gap G is slightly less than the width of the battery which is to be separated. As the battery passes down between the members 34 and 32 into the gap G, the plate 42 may yield leftwardly sufficiently to allow the battery to come forcibly into engagement with the shoulders 40 and 41.

I claim:

1. In a device of the character described for removing the contents from a case: an arcuate guide defining an arcuate path of movement; a power driven means including an arm adapted to propel the case and contents through said arcuate path of movement at a velocity which is initially low and which thereafter increases; and means beyond the end of said arcuate path of movement acting to abruptly reduce the speed of said case so that momentum will act in said contents to separate the same from said case.

2. In a device of the character described for removing the contents from a case: an arcuate guide defining an arcuate path of movement; power driven means including a battery propelling member for propelling the case and contents through said arcuate path of movement at a velocity which is initially low and which thereafter increases; walls defining a diverging path of movement to receive the case from said arcuate path of movement; and shoulders arranged at the end of said diverging path of movement to engage the side walls of the case so as to abruptly reduce the movement of said case whereupon momentum will then act in said contents to separate the same from said case.

3. In a device of the character described for removing the contents from a case: an arcuate guide defining an arcuate path of movement; power driven means including a battery propelling member for propelling the case and contents through said arcuate path of movement at a velocity which is initially low and which thereafter increases; means defining a tangential path of movement extending from the end of said arcuate path of movement to receive the case from said arcuate path of movement; shoulders arranged at the end of said tangential path of movement to engage the side walls of the case so as to abruptly reduce the movement of said case whereupon momentum will then act in said contents to separate the same from said case; and means operating in timed relation to said propelling means to remove said case from said shoulders.

4. In a device of the character described for removing the contents from a case: arcuate wall means defining an arcuate path of movement for the case and control; an arm supported for rotary movement so that a portion thereof will move along said arcuate path of movement and so as to engage the case at an initial point in said arcuate path of movement at a velocity which is initially low and which thereafter increases; means for rotating said arm so as to carry said case and said contents through said path of movement and effect a high velocity therein; and means contiguous the end of said path of movement acting to abruptly reduce the speed of said case so that momentum will act in said contents to separate the same from said case.

5. In a device of the character described for removing the contents from a case: arcuate wall means defining an arcuate path of movement for the case and control; an arm supported for rotary movement so that a portion thereof will move along said arcuate path of movement and so as to engage the case at an initial point in an arcuate path of movement; means for rotating said arm at relatively low speed at the time it engages said case and then increasing the speed of said arm so that by the time said case and contents reach the end of said path of movement they will be travelling at high velocity; and shoulder means at the end of said path of movement acting to abruptly reduce the speed of said case so that momentum will act in said contents to separate the same from said case.

6. In a device of the character described for removing the contents from the case: arcuate wall means defining an arcuate path of movement for the case and control; an arm supported for rotary movement so that a portion thereof will move along said arcuate path of movement and so as to engage the case at an initial point in an arcuate path of movement; means for rotating said arm at relatively low speed at the time it engages said case and then increasing the speed of said arm so that by the time said case and contents reach the end of said path of movement they will be travelling at high velocity; means disposed beyond the end of said path of movement acting to abruptly reduce the speed of said case so that momentum will act in said contents to separate the same from said case; and means operating in timed relation to the movement of said arm to remove said case from the end of said path of movement.

7. In a device of the character described for removing the contents from a case: an arcuate guide defining an arcuate path of movement; power driven means including a variable lever-arm linkage and a battery propelling member for propelling the case and contents through said path of movement first at relatively low velocity and then at higher velocity so that said case and contents will be moving at high velocity contiguous the end of said path of movement; and means at the end of said path of movement acting to abruptly reduce the speed of said case so that momentum will act in said contents to separate the same from said case.

8. In a device of the character described for removing the contents from a case: an arcuate guide defining an arcuate path of movement; power driven means including first and second eccentric gear means and a battery propelling member for propelling the case and contents through said path of movement, said first eccentric gear means being connected to said battery propelling member which transmits propelling movement to said case and the contents, and said second eccentric gear means being arranged for rotation adjacent said first eccentric gear means and having a high leverage portion thereof connected to a low leverage portion of said first eccentric gear means; and shoulders supported contiguous the end of said path of movement to enage the side walls of the case so as to abruptly reduce the movement of said case whereupon momentum will then act in said contents to separate the same from said case.

9. In a device of the character described for removing the contents from a battery case: an arcuate guide wall defining an arcuate path of movement around an axis; an arm member swingable around said axis from a position adjacent the front end of said path of movement toward the rear end of said path of movement, said arm having a case engaging portion which moves in said path and is adapted to engage said case so as to propel the same; means for swinging said arm so that said case engaging portion will propel said case and contents through said path of movement at a velocity which is initially low and which thereafter increases; and shoulders supported contiguous the end of said path of movement to engage the case and stop the same so that the continued forward movement of said contents by momentum acting therein will separate said contents from said case.

10. In a device of the character described for removing the contents from a case: an arcuate guide wall defining an arcuate path of movement around an axis; an arm member swingable around said axis from a position adjacent the front end of said path of movement toward the rear end of said path of movement, said arm having a case engaging portion which moves in said path and is adapted to engage said case so as to propel the same; driving gear means; a driven gear means driven by said driving gear means and being arranged for eccentric rotation at a velocity varying from low speed to high speed and being connected to said arm so that rotation of said driven gear means will rotate said arm at low speed when it is at the front end of said path of movement and at high speed when it is near the rear end of said path of movement, whereby said case engaging portion of said arm will propel said case and contents through said path of movement first at relatively slow speed and then at high velocity; and shoulders supported contiguous the end of said path of movement to engage the case and stop the same so that the continued forward movement of said contents by momentum acting therein will separate said contents from said case.

11. In a device of the character described for removing the contents from a case: an arcuate guide wall defining an arcuate path of movement around an axis; an arm member swingable around said axis from a position adjacent the front end of said path of movement toward the rear end of said path of movement, said arm having a case engaging portion which moves in said path and is adapted to engage said case so as to propel the same; a driving gear means; a driven gear means connected to said arm so as to rotate the same around said axis, at least one of said gear means being eccentric; a chain member connecting said gear means so that rotation of said driving gear means will drive said driven gear means at a velocity which varies from low speed when said arm is near the front end of said path of movement to high speed when said arm is near the end of said path of movement, whereby said case engaging portion of said arm will propel said case and contents through said path of movement first at relatively slow speed and then at high velocity; and shoulders supported contiguous the end of said path of movement to engage the case and stop the same so that the continued forward movement of said contents by momentum acting therein will separate said contents from said case.

12. A device as defined in claim 11 wherein both of said gear means are mounted for eccentric rotation.

13. A device as defined in claim 11 wherein said chain is in the form of a loop and having take-up means for maintaining said chain taut.

14. A device as defined in claim 11 having a case holder for holding a case in a position to be engaged by said case engaging portion of said arm.

15. A device as defined in claim 11 having a case holder for holding a case in a position to be engaged by said case engaging portion of said arm, means for moving said holder into retracted position and means operating in timed relation to the movement of said arm to move said case away from said shoulders after the contents have been separated from said case.

References Cited in the file of this patent

UNITED STATES PATENTS

| | | |
|---|---|---|
| 1,344,013 | Winkley | June 22, 1920 |
| 1,807,889 | Belin | June 2, 1931 |
| 2,119,857 | Eppensteiner | June 7, 1938 |
| 2,457,519 | Bemel | Dec. 28, 1948 |
| 2,567,542 | Blake | Sept. 11, 1951 |
| 2,627,654 | King | Feb. 10, 1953 |